(12) United States Patent
Chen et al.

(10) Patent No.: US 12,594,942 B2
(45) Date of Patent: Apr. 7, 2026

(54) METHOD AND APPARATUS FOR DETECTING COMPLEXITY OF TRAVELING SCENARIO OF VEHICLE

(71) Applicant: SHENZHEN YINWANG INTELLIGENT TECHNOLOGIES CO., LTD., Shenzhen (CN)

(72) Inventors: Wei Chen, Shanghai (CN); Zhiliang Yao, Shenzhen (CN); Rongjie Yu, Shanghai (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 438 days.

(21) Appl. No.: 17/956,087

(22) Filed: Sep. 29, 2022

(65) Prior Publication Data

US 2023/0050063 A1 Feb. 16, 2023

Related U.S. Application Data

(63) Continuation of application No. PCT/CN2020/082412, filed on Mar. 31, 2020.

(51) Int. Cl.
*B60W 40/04* (2006.01)
*B60W 30/16* (2020.01)
(Continued)

(52) U.S. Cl.
CPC ............ *B60W 40/04* (2013.01); *B60W 30/16* (2013.01); *B60W 40/105* (2013.01); *G06V 20/58* (2022.01);
(Continued)

(58) Field of Classification Search
None
See application file for complete search history.

(56) References Cited

U.S. PATENT DOCUMENTS

| | | | |
|---|---|---|---|
| 8,447,437 B2 | 5/2013 | Chiang | |
| 2012/0130561 A1* | 5/2012 | Chiang | G08G 1/165 |
| | | | 701/1 |

(Continued)

FOREIGN PATENT DOCUMENTS

| | | |
|---|---|---|
| CN | 106205169 A | 12/2016 |
| CN | 107672597 A | 2/2018 |

(Continued)

OTHER PUBLICATIONS

English translation of CN-111178402-A (wherein the paragraph numbering provided coincides with any relevant citations to this reference within the accompanying Office Action) (Year: 2020).*

(Continued)

*Primary Examiner* — Jason Holloway
*Assistant Examiner* — Bryant Tang
(74) *Attorney, Agent, or Firm* — Conley Rose, P.C.

(57) ABSTRACT

A method for detecting a complexity of a traveling scenario of a vehicle includes obtaining a travelling speed of the vehicle and a travelling speed of a target vehicle, determining, based on the traveling speed of the vehicle and the traveling speed of the target vehicle, a dynamic complexity of a traveling scenario in which the vehicle is located, determining static information of each static factor in the traveling scenario in which the vehicle is currently located, obtaining, based on the static information of each static factor, a static complexity of the traveling scenario in which the vehicle is located, and obtaining, based on the dynamic complexity and the static complexity, a comprehensive complexity of the traveling scenario in which the vehicle is located.

20 Claims, 4 Drawing Sheets

(51) Int. Cl.
    *B60W 40/105*         (2012.01)
    *G06V 20/58*         (2022.01)

(52) U.S. Cl.
    CPC ... *B60W 2420/403* (2013.01); *B60W 2554/20* (2020.02); *B60W 2554/408* (2020.02); *B60W 2554/80* (2020.02); *B60W 2555/20* (2020.02)

(56)          References Cited

U.S. PATENT DOCUMENTS

| | | | |
|---|---|---|---|
| 2017/0259801 A1 | 9/2017 | Abou-Nasr et al. | |
| 2018/0326985 A1* | 11/2018 | Hermann | B60W 50/14 |
| 2019/0176841 A1 | 6/2019 | Englard et al. | |
| 2019/0232955 A1* | 8/2019 | Grimm | G06V 10/803 |

FOREIGN PATENT DOCUMENTS

| | | | | |
|---|---|---|---|---|
| CN | 107697071 A | 2/2018 | | |
| CN | 107833312 A | 3/2018 | | |
| CN | 108482385 A | 9/2018 | | |
| CN | 108922177 A | 11/2018 | | |
| CN | 109017786 A | 12/2018 | | |
| CN | 110020504 A | 7/2019 | | |
| CN | 110579359 A | 12/2019 | | |
| CN | 110660214 A | 1/2020 | | |
| CN | 110660270 A | 1/2020 | | |
| CN | 111178402 A | * 5/2020 | | G06K 9/6267 |
| CN | 111797000 A | * 10/2020 | | G06F 11/3688 |
| EP | 2444947 A1 | 4/2012 | | |
| EP | 3239011 A1 | 11/2017 | | |

OTHER PUBLICATIONS

Wang Jianqiang et al., "Concept, Principle and Modeling of Driving Risk Field Based on Driver-vehicle-road Interaction," China Journal of Highway and Transport, vol. 29, No. 1, Jan. 2016, with an English abstract, total 10 pages.

* cited by examiner

METHOD AND APPARATUS FOR DETECTING COMPLEXITY OF TRAVELING SCENARIO OF VEHICLE

CROSS-REFERENCE TO RELATED APPLICATIONS

This is a continuation of International Patent Application No. PCT/CN2020/082412 filed on Mar. 31, 2020, the disclosure of which is hereby incorporated by reference in its entirety.

TECHNICAL FIELD

This application relates to the field of self-driving technologies, and furthermore, to a method and an apparatus for detecting a complexity of a traveling scenario of a vehicle.

BACKGROUND

With rapid development of self-driving cars, traffic safety of the self-driving car also attracts more attention from people. In a high-complexity driving scenario, self-driving of the self-driving car may be dangerous, and thus a driver may need to take over self-driving to perform manual driving. In this way, to prompt, in the high-complexity traveling scenario, the driver to be ready to take over driving, it is greatly important to determine a complexity of the traveling scenario.

Currently, the following method may be generally used to determine the complexity of the traveling scenario. An in-vehicle Global Positioning System (GPS) and a high-definition map are used to determine an actual value of a static factor and a traveling speed of a current vehicle that affect vehicle traveling safety and that are in a traveling scenario in which the vehicle is currently located. The static factor includes a quantity of lanes, a middle separation form, a width of a lane in which the vehicle is located, and the like. A complexity corresponding to the actual value of each static factor is determined based on pre-stored complexities corresponding to different values of the static factor. A complexity corresponding to the traveling speed of the vehicle is determined based on a complexity corresponding to a traveling speed interval. Then, the determined complexities are added to obtain a complexity of the traveling scenario in which the vehicle is currently located.

A conventional technology has at least the following problem.

In the traveling scenario of the vehicle, in addition to the static factor and the traveling speed of the vehicle that are mentioned in the foregoing method, a traveling status of another vehicle in a specific range around the vehicle further affects vehicle traveling safety. Therefore, the complexity that is of the traveling scenario and that is determined only based on the foregoing factor cannot fully reflect an actual complexity of the traveling scenario in which the vehicle is currently located. Consequently, self-driving of the vehicle has a safety risk.

SUMMARY

Embodiments of this application provide a method and an apparatus for detecting a complexity of a traveling scenario of a vehicle, to overcome a problem that a complexity determined in a related technology cannot fully reflect an actual complexity of the traveling scenario in which the vehicle is currently located.

According to a first aspect, a method for detecting a complexity of a traveling scenario of a vehicle is provided, where the method includes obtaining a traveling speed of the vehicle and a traveling speed of a target vehicle, where the target vehicle is a target vehicle that meets a preset distance condition with the vehicle, obtaining, based on the traveling speed of the vehicle and the traveling speed of the target vehicle, a dynamic complexity of a traveling scenario in which the vehicle is located, determining static information of each static factor in the traveling scenario in which the vehicle is currently located, determining, based on the static information of each static factor, a static complexity of the traveling scenario in which the vehicle is located, and determining, based on the dynamic complexity and the static complexity, a comprehensive complexity of the traveling scenario in which the vehicle is located.

In the solution shown in this embodiment of this application, the traveling speed of the target vehicle in a specific range of the vehicle may be detected using an in-vehicle radar, and the dynamic complexity of the traveling scenario in which the vehicle is located is calculated based on the traveling speed of the target vehicle and the traveling speed of the vehicle. The dynamic complexity is used to represent a degree to which a traveling status of the target vehicle in the traveling scenario in which the vehicle is located affects traveling of the vehicle. In addition, the static information of each static factor in the traveling scenario in which the vehicle is located may also be obtained using an in-vehicle GPS and a high-definition map. For example, if the static factor is a lane width, the static information may be an actual lane width value.

The static complexity of the traveling scenario in which the vehicle is located is obtained based on the static information of each static factor. The static complexity is used to represent a degree to which the static factor in the traveling scenario in which the vehicle is located affects traveling of the vehicle. Finally, the dynamic complexity of the traveling scenario in which the vehicle is located may be calculated by combining the dynamic complexity and the static complexity. In this solution, the static factor and the traveling status of the target vehicle in the specific range are combined to comprehensively determine the comprehensive complexity of the traveling scenario in which the vehicle is located such that an actual complexity of the traveling scenario in which the vehicle is currently located can be more fully reflected.

In a possible implementation, the obtaining, based on the traveling speed of the vehicle and the traveling speed of the target vehicle, a dynamic complexity of a traveling scenario in which the vehicle is located includes obtaining, for each target vehicle based on the traveling speed of the vehicle and a traveling speed of the target vehicle, a complexity corresponding to the target vehicle, and adding the complexities corresponding to the target vehicles to obtain the dynamic complexity of the traveling scenario in which the vehicle is located.

In the solution shown in this embodiment of this application, when the dynamic complexity is determined, the complexity corresponding to each target vehicle may be calculated using each target vehicle as a research object, and the dynamic complexity of the traveling scenario in which the vehicle is located is calculated by combining the complexities corresponding to the target vehicles.

In a possible implementation, the obtaining, based on the traveling speed of the vehicle and a traveling speed of the target vehicle, a complexity corresponding to the target vehicle includes obtaining an included angle $\theta_{ij}$ between a traveling direction of the vehicle and a relative traveling speed between the vehicle and the target vehicle, and determining, based on the included angle $\theta_{ij}$, the complexity corresponding to the target vehicle.

In the solution shown in this embodiment of this application, the relative traveling speed between the vehicle and the target vehicle may be a value obtained by subtracting the traveling speed of the vehicle from the traveling speed of the target vehicle. When the included angle $\theta_{ij}$ between the traveling direction of the vehicle and the relative traveling speed between the vehicle and the target vehicle is calculated, the following method may be used:

$$\theta_{ij} = \tan^{-1}\frac{|\overrightarrow{V_{h\_ij}}|}{|\overrightarrow{V_{v\_ij}}|}, \quad \text{where } \theta_{ij} \in [0°, 90°].$$

$\overrightarrow{V_{h\_ij}}$ is a horizontal relative speed between the vehicle and the target vehicle, namely, a value obtained by subtracting a component of the traveling speed of the vehicle in a horizontal direction perpendicular to the traveling direction of the vehicle from a component of the traveling speed of the target vehicle in the horizontal direction perpendicular to the traveling direction of the vehicle, and $\overrightarrow{V_{v\_ij}}$ is a vertical relative speed between the vehicle and the target vehicle, namely, a value obtained by subtracting a component of the traveling speed of the vehicle in the traveling direction of the vehicle from a component of the traveling speed of the target vehicle in the traveling direction of the vehicle.

In a possible implementation, the determining, based on the included angle $\theta_{ij}$, the complexity corresponding to the target vehicle includes substituting the included angle $\theta_{ij}$ into the following equation:

$$f(\theta_{ij}) = \frac{1}{2}\left\{1 - \cos\left[\left(\frac{180}{67.5}\right)\cdot\frac{2\theta_{ij}}{3}\cdot\frac{\pi}{180} + \frac{\pi}{10}\right]\right\},$$

to obtain an initial complexity $f(\theta_{ij})$ corresponding to the target vehicle, and correcting, based on a distance between the target vehicle and the vehicle and the relative speed between the target vehicle and the vehicle, the initial complexity $f(\theta_{ij})$ corresponding to the target vehicle, to obtain the complexity corresponding to the target vehicle.

In the solution shown in this embodiment of this application, to more accurately calculate the complexity corresponding to each target vehicle, the initial complexity may be corrected based on the distance between the target vehicle and the vehicle and the relative speed between the target vehicle and the vehicle.

In a possible implementation, the correcting, based on a distance between the target vehicle and the vehicle and the relative speed between the target vehicle and the vehicle, the initial complexity $f(\theta_{ij})$ corresponding to the target vehicle, to obtain the complexity corresponding to the target vehicle includes: obtaining a first safe distance between the vehicle and the target vehicle based on the traveling speed, a maximum deceleration, and a minimum deceleration of the vehicle, the traveling speed and a maximum deceleration of the target vehicle, and a preset driver reaction time, calculating a first difference between a preset danger distance and a component of the distance between the target vehicle and the vehicle in the traveling direction of the vehicle, calculating a second difference between the first safe distance and the preset danger distance, calculating a ratio between the first difference and the second difference to obtain a standard vertical distance p between the vehicle and the target vehicle, substituting the standard vertical distance P into the following equation: $f_1(p)=(1-p)\lg(1/p)$, to obtain a vertical correction coefficient $f_1(p)$, calculating a third difference between a preset danger horizontal relative speed and a horizontal relative speed between the target vehicle and the vehicle, calculating a fourth difference between a preset safe horizontal relative speed and the preset danger horizontal relative speed, calculating a ratio between the third difference and the fourth difference to obtain a standard horizontal relative speed q between the vehicle and the target vehicle, substituting the standard horizontal relative speed q into the following equation: $f_1(q)=(1-q)\lg(1/q)$, to obtain a horizontal correction coefficient $f_1(q)$ and multiplying the initial complexity $f(\theta_{ij})$ corresponding to the target vehicle, the vertical correction coefficient $f_1(q)$, and the horizontal correction coefficient $f_1(q)$, to obtain the complexity corresponding to the target vehicle.

In the solution shown in this embodiment of this application, when the initial complexity is corrected, consideration may be given in two directions: a horizontal direction and a vertical direction. The horizontal direction is the horizontal direction perpendicular to the traveling direction of the vehicle, and the vertical direction is the traveling direction of the vehicle. During horizontal correction, correction may be performed based on the horizontal relative speed between the vehicle and the target vehicle. During vertical correction, correction may be performed based on the vertical distance between the vehicle and the target vehicle.

In a possible implementation, the obtaining, based on the static information of each static factor, a static complexity of the traveling scenario in which the vehicle is located includes obtaining values of the plurality of static factors based on static information of the plurality of static factors, and obtaining, based on a correspondence between the values of the plurality of static factors and complexities, complexities respectively corresponding to the plurality of static factors, and obtaining, based on the complexities respectively corresponding to the plurality of static factors, the static complexity of the traveling scenario in which the vehicle is located.

In the solution shown in this embodiment of this application, a value of each static factor may be first determined based on the static information of the static factor. For example, the static factor is a lane width, and the corresponding static information may be 3 meters (m), 3.5 m, 4 m, 4.5 m, and the like. In this case, the value of the static factor may be a wide lane (lane width≥3.5 m) and a narrow lane (lane width<3.5 m). Then, the complexities respectively corresponding to the plurality of static factors is obtained based on the correspondence between a value of a static factor and a complexity. Finally, the complexities respectively corresponding to the plurality of static factors are added to obtain the static complexity of the traveling scenario in which the vehicle is located.

In a possible implementation, the determining, based on the complexities respectively corresponding to the plurality of static factors, the static complexity of the traveling scenario in which the vehicle is located includes obtaining weights respectively corresponding to the plurality of static factors, respectively multiplying the complexities corresponding to the values of the plurality of static factors by the corresponding weights to obtain weighted complexities respectively corresponding to the plurality of static factors, and adding the weighted complexities corresponding to the plurality of static factors to obtain the static complexity of the traveling scenario in which the vehicle is located.

In the solution shown in this embodiment of this application, considering that the static factors impose different impacts on traveling of the vehicle, when the static complexity of the traveling scenario in which the vehicle is located is determined based on the complexity corresponding to each static factor, the complexity corresponding to each static factor in the traveling scenario in which the vehicle is located may be first multiplied by the weight corresponding to the static factor, to obtain the weighted complexity corresponding to the static factor, and then the weighted complexities corresponding to the static factors are added to obtain the static complexity of the traveling scenario in which the vehicle is located.

In a possible implementation, the method further includes that for a first value of a first static factor, obtaining N sample images corresponding to the first value, where N is an integer greater than 1, separately performing image recognition on the N sample images to obtain a predicted value corresponding to each sample image, counting a quantity M of sample images whose corresponding predicted values are different from corresponding ground truth values, where the ground truth value is used to uniquely identify the first value, and obtaining a ratio of M to N as a complexity corresponding to the first value.

In the solution shown in this embodiment of this application, for each value of each static factor, a complexity corresponding to the value may be pre-determined, and the value of the static factor and the corresponding complexity are correspondingly stored. When the complexity corresponding to the value of the static factor is pre-determined, N sample images corresponding to the value may be obtained. Then, image recognition is separately performed on the N sample images to obtain a predicted value corresponding to each sample image. A quantity M of sample images whose corresponding predicted values are different from corresponding ground truth values is counted. A ratio of M to N is obtained as the complexity corresponding to the value. When the sample image is obtained, to save manpower, a sample image corresponding to each value of each static factor may be obtained using a high-definition streetscape map.

In a possible implementation, the static factor includes at least one of a road type, a quantity of co-directional lanes, a lane width, a central isolation form, an isolation form between a motor vehicle and a non-motor vehicle, a traffic sign, and a traffic light.

In the solution shown in this embodiment of this application, static information corresponding to the road type may be an urban expressway, a trunk road, a secondary trunk road, and a branch way. In this case, a corresponding value may also be the urban expressway, the trunk road, the secondary trunk road, and the branch way. Static information corresponding to the quantity of co-directional lanes may be 1, 2, 3, 4, 5, 6, and the like. In this case, a corresponding value may be 1, 2, 3, 4, and a value greater than or equal to 5. Static information corresponding to the lane width may be 3 m, 3.5 m, 4 m, 4.5 m, and the like. In this case, a corresponding value may be a wide lane (lane width≥3.5 m) and a narrow lane (lane width<3.5 m). Static information corresponding to the central isolation form may be: there is no central isolation, marking-line isolation, a hard barrier, and greening isolation. In this case, a corresponding value may also be: there is no central isolation, the marking-line isolation, the hard barrier, and the greening isolation. Static information corresponding to the isolation form between the motor vehicle and the non-motor vehicle may be: there is no isolation between the motor vehicle and the non-motor vehicle, marking-line isolation, a hard barrier, and greening isolation. In this case, a corresponding value may also be: there is no isolation between the motor vehicle and the non-motor vehicle, the marking-line isolation, the hard barrier, and the greening isolation. Static information corresponding to the traffic sign may be: a speed limit sign of 40 kilometers/hour (km/h), a speed limit sign of 60 km/h, there is no speed limit sign, and the like. In this case, a corresponding value may be that there is a speed limit sign and there is no speed limit sign. Static information corresponding to the traffic light is that the traffic light is a red light, the traffic light is a green light, the traffic light is a yellow light, and there is no traffic light. In this case, a corresponding value may be that there is a traffic light and there is no traffic light.

In a possible implementation, the method further includes obtaining static information of an environment factor in the traveling scenario in which the vehicle is located, obtaining a value of the environment factor based on the environment information of the environment factor, and determining, based on a stored correspondence between a value of an environment factor and a complexity correction coefficient, a target complexity correction coefficient corresponding to the environment factor in the traveling scenario in which the vehicle is located, and the determining, based on the dynamic complexity and the static complexity, a comprehensive complexity of the traveling scenario in which the vehicle is located includes multiplying, by the target complexity correction coefficient, a value obtained by adding the dynamic complexity and the static complexity, to obtain the comprehensive complexity of the traveling scenario in which the vehicle is located.

In the solution shown in this embodiment of this application, in addition to the static factor and the traveling status of the target vehicle, the environment factor is also an important factor that affects traveling of the vehicle. In other words, the environment factor also imposes an impact on the complexity of the traveling scenario in which the vehicle is located. An environment image in the traveling scenario may be obtained using a camera of a sensing system of the vehicle, environment information of each environment factor is recognized from the environment image using a pattern recognition algorithm constructed in advance, and then the environment information of the environment factor may be used as a value of the environment factor. In this way, the target complexity correction coefficient corresponding to the value of the environment factor of the traveling scenario in which the vehicle is located may be obtained based on the correspondence between a value of an environment factor and a complexity correction coefficient, and the target complexity correction coefficient is used to correct the dynamic complexity and the static complexity.

In a possible implementation, the environment factor includes lighting, weather, and a road surface condition.

In the solution shown in this embodiment of this application, a value corresponding to the lighting may include daytime, dusk or dawn, night with lighting, and night without lighting. A value corresponding to the weather may include a sunny day, a cloudy day, a rainy day, a snowy day, and a foggy day. A value corresponding to the road surface condition may include dryness, wetness, accumulated snow, and ice.

In a possible implementation, the determining a target vehicle that meets a preset distance condition with the vehicle includes: if there is a forward vehicle in a same lane as the vehicle, determining, as a reference vehicle, a forward vehicle that is in the forward vehicle in the same lane as the vehicle and that has a minimum distance from the vehicle, determining a traveling speed of the reference vehicle and a component of a distance between the reference vehicle and the vehicle in the traveling direction of the vehicle, determining a second safe distance between the vehicle and the reference vehicle based on the traveling speed, a preset maximum acceleration, and a preset minimum deceleration of the vehicle, the traveling speed and a preset maximum deceleration of the reference vehicle, and the preset driver reaction time, determining a smaller value in the second safe distance and the component of the distance between the reference vehicle and the vehicle in the traveling direction of the vehicle, and determining, as the target vehicle, a forward vehicle in a lane in which the vehicle is located and an adjacent lane, where a component of a distance between the forward vehicle and the vehicle in the traveling direction of the vehicle is not greater than the smaller value, or if there is no forward vehicle in a same lane as the vehicle, determining a third safe distance based on the traveling speed, a preset maximum acceleration, and a preset minimum deceleration of the vehicle, a preset forward-vehicle traveling speed, the preset maximum deceleration, and the preset driver reaction time, where the preset forward-vehicle traveling speed is 0, and determining, as the target vehicle, a forward vehicle in a lane in which the vehicle is located and an adjacent lane, where a component of a distance between the forward vehicle and the vehicle in the traveling direction of the vehicle is not greater than the third safe distance.

According to a second aspect, an apparatus for detecting a complexity of a traveling scenario of a vehicle is provided, where the apparatus includes an obtaining module configured to obtain a traveling speed of the vehicle and a traveling speed of a target vehicle, where the target vehicle is a vehicle that meets a preset distance condition with the vehicle, a first determining module configured to obtain, based on the traveling speed of the vehicle and the traveling speed of the target vehicle, a dynamic complexity of a traveling scenario in which the vehicle is located, a second determining module configured to obtain static information of each static factor in the traveling scenario in which the vehicle is located, a third determining module configured to obtain, based on the static information of each static factor, a static complexity of the traveling scenario in which the vehicle is located, and a fourth determining module configured to obtain, based on the dynamic complexity and the static complexity, a comprehensive complexity of the traveling scenario in which the vehicle is located.

In a possible implementation, the first determining module is configured to obtain, for each target vehicle based on the traveling speed of the vehicle and a traveling speed of the target vehicle, a complexity corresponding to the target vehicle, and add the complexities corresponding to the target vehicles to obtain the dynamic complexity of the traveling scenario in which the vehicle is located.

In a possible implementation, the first determining module is configured to obtain a relative traveling speed between the vehicle and the target vehicle based on the traveling speed of the vehicle and the traveling speed of the target vehicle, obtain an included angle $\theta_{ij}$ between a traveling direction of the vehicle and the relative traveling speed between the vehicle and the target vehicle, and obtain, based on the included angle $\theta_{ij}$, the complexity corresponding to the target vehicle.

In a possible implementation, the first determining module is configured to substitute the included angle into the following equation:

$$f(\theta_{ij}) = \frac{1}{2}\left\{1 - \cos\left[\left(\frac{180}{67.5}\right)\cdot\frac{2\theta_{ij}}{3}\cdot\frac{\pi}{180} + \frac{\pi}{10}\right]\right\},$$

to obtain an initial complexity $f(\theta_{ij})$ corresponding to the target vehicle; and correct, based on a distance between the target vehicle and the vehicle and the relative traveling speed between the target vehicle and the vehicle, the initial complexity $f(\theta_{ij})$ corresponding to the target vehicle, to obtain the complexity corresponding to the target vehicle.

In a possible implementation, the first determining module is configured to obtain a first safe distance between the vehicle and the target vehicle based on the traveling speed, a maximum deceleration, and a minimum deceleration of the vehicle, the traveling speed and a maximum deceleration of the target vehicle, and a preset driver reaction time, calculate a first difference between a preset danger distance and a component of the distance between the target vehicle and the vehicle in the traveling direction of the vehicle, calculate a second difference between the first safe distance and the preset danger distance, calculate a ratio between the first difference and the second difference to obtain a standard vertical distance p between the vehicle and the target vehicle, substitute the standard vertical distance P into the following equation: $f_1(p)=(1-p)\lg(1/p)$, to obtain a vertical correction coefficient $f_1(p)$, calculate a third difference between a preset danger horizontal relative speed and a horizontal relative speed between the target vehicle and the vehicle, calculate a fourth difference between a preset safe horizontal relative speed and the preset danger horizontal relative speed, calculate a ratio between the third difference and the fourth difference to obtain a standard horizontal relative speed q between the vehicle and the target vehicle, substitute the standard horizontal relative speed q into the following equation: $f_1(q)=(1-q)\lg(1/q)$, to obtain a horizontal correction coefficient $f_1(q)$, and multiply the initial complexity $f(\theta_{ij})$ corresponding to the target vehicle, the vertical correction coefficient $f_1(q)$, and the horizontal correction coefficient $f_1(q)$, to obtain the complexity corresponding to the target vehicle.

In a possible implementation, the third determining module is configured to obtain values of the plurality of static factors based on static information of the plurality of static factors, and obtain, based on a correspondence between the values of the plurality of static factors and complexities, complexities respectively corresponding to the plurality of static factors, and obtain, based on the complexities respectively corresponding to the plurality of static factors, the static complexity of the traveling scenario in which the vehicle is located.

In a possible implementation, the third determining module is configured to obtain weights respectively corresponding to the plurality of static factors, respectively multiply the complexities corresponding to the values of the plurality of static factors by the corresponding weights to obtain weighted complexities respectively corresponding to the plurality of static factors, and add the weighted complexities corresponding to the plurality of static factors to obtain the static complexity of the traveling scenario in which the vehicle is located.

In a possible implementation, the apparatus further includes a counting module configured to: for a first value of a first static factor, obtain N sample images corresponding to the first value, where N is an integer greater than 1, separately perform image recognition on the N sample images to obtain a predicted value corresponding to each sample image, count a quantity M of sample images whose corresponding predicted values are different from corresponding ground truth values, where the ground truth value is used to uniquely identify the first value, and obtain a ratio of M to N as a complexity corresponding to the first value.

In a possible implementation, the static factor includes at least one of a road type, a quantity of co-directional lanes, a lane width, a central isolation form, an isolation form between a motor vehicle and a non-motor vehicle, a traffic sign, and a traffic light.

In a possible implementation, the apparatus further includes a correction module configured to obtain environment information of an environment factor in the traveling scenario in which the vehicle is located, obtain a value of the environment factor based on the environment information of the environment factor, and obtain, based on a stored correspondence between a value of an environment factor and a complexity correction coefficient, a target complexity correction coefficient corresponding to the value of the environment factor in the traveling scenario in which the vehicle is located, and the fourth module is configured to multiply, by the target complexity correction coefficient, a value obtained by adding the dynamic complexity and the static complexity, to obtain the comprehensive complexity of the traveling scenario in which the vehicle is located.

In a possible implementation, the environment factor includes at least one of lighting, weather, and a road surface condition.

In a possible implementation, the obtaining module is configured to: if there is a forward vehicle in a same lane as the vehicle, determine, as a reference vehicle, a forward vehicle that is in the forward vehicle in the same lane as the vehicle and that has a minimum distance from the vehicle, obtain a traveling speed of the reference vehicle and a component of a distance between the reference vehicle and the vehicle in the traveling direction of the vehicle, obtain a second safe distance between the vehicle and the reference vehicle based on the traveling speed, a preset maximum acceleration, and a preset minimum deceleration of the vehicle, the traveling speed and a preset maximum deceleration of the reference vehicle, and the preset driver reaction time, obtain a smaller value in the second safe distance and the component of the distance between the reference vehicle and the vehicle in the traveling direction of the vehicle; and use, as the target vehicle, a forward vehicle in a lane in which the vehicle is located and an adjacent lane, where a component of a distance between the forward vehicle and the vehicle in the traveling direction of the vehicle is not greater than the smaller value, or if there is no forward vehicle in a same lane as the vehicle, obtain a third safe distance based on the traveling speed, a preset maximum acceleration, and a preset minimum deceleration of the vehicle, a preset forward-vehicle traveling speed, the preset maximum deceleration, and the preset driver reaction time, where the preset forward-vehicle traveling speed is 0, and use, as the target vehicle, a forward vehicle in a lane in which the vehicle is located and an adjacent lane, where a component of a distance between the forward vehicle and the vehicle in the traveling direction of the vehicle is not greater than the third safe distance.

According to a third aspect, a vehicle traveling decision controller is provided, where the vehicle traveling decision controller includes a processor and a memory; and the memory stores at least one computer readable instruction, and the computer readable instruction is configured to be executed by the processor, to implement the method for detecting a complexity of a traveling scenario of a vehicle according to the first aspect.

According to a fourth aspect, a computer-readable storage medium is provided, including computer readable instructions, where when the computer-readable storage medium is run on a vehicle traveling decision controller, the vehicle traveling decision controller is enabled to perform the method for detecting a complexity of a traveling scenario of a vehicle according to the first aspect.

According to a fifth aspect, a computer program product including instructions is provided, where when the computer program product is run on a vehicle traveling decision controller, the vehicle traveling decision controller is enabled to perform the method for detecting a complexity of a traveling scenario of a vehicle according to the first aspect.

The technical solutions provided in this application include at least the following beneficial effects.

In this application, the static complexity of the traveling scenario in which the vehicle is located is determined based on the static information of each static factor in the traveling scenario in which the vehicle is located. In addition, the dynamic complexity of the traveling scenario in which the vehicle is located is further determined based on the traveling speed of the vehicle and the traveling speed of the target vehicle. The target vehicle is a vehicle that meets the preset distance condition with the vehicle. In this way, the comprehensive complexity of the traveling scenario in which the vehicle is located is comprehensively determined by combining the static complexity determined using the static factor and the dynamic complexity determined using a traveling status of a surrounding vehicle. The comprehensive complexity may more fully reflect a complexity of the traveling scenario in which the vehicle is currently located.

DESCRIPTION OF EMBODIMENTS

To make objectives, technical solutions, and advantages of this application clearer, the following further describes implementations of this application in detail with reference to the accompanying drawings.

Embodiments of this application provide a method for detecting a complexity of a traveling scenario of a vehicle, and the method may be applied to a self-driving car. The method may be implemented by a vehicle traveling decision controller in the self-driving car. A sensing system, a positioning system, and the like may be deployed in the self-driving car. The sensing system may include a radar, a camera, and the like. The positioning system may be a GPS, a BEIDOU system, and the like.

Figure 1:
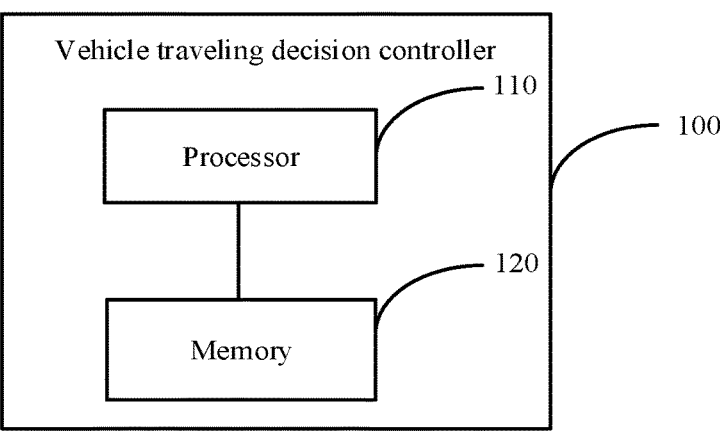
FIG. 1 is a schematic diagram of a structure of a vehicle traveling decision controller according to an embodiment of this application.

FIG. 1 is a schematic diagram of a vehicle traveling decision controller 100 according to an embodiment of this application. In FIG. 1, the vehicle traveling decision controller may include a processor 101 and a memory 102. The processor 101 may be a central processing unit (CPU). The processor 101 may be one processor, or may include a plurality of processors. The memory 102 may include a volatile memory such as a random-access memory (RAM), or the memory may include a non-volatile memory such as a read-only memory (ROM) and a flash memory. The memory may alternatively include a combination of the foregoing types of memories. The memory 102 may be one memory, or may include a plurality of memories. The memory 102 stores computer readable instructions. The computer readable instructions may be executed by the processor 101, to implement the method for detecting a complexity of a traveling scenario of a vehicle provided in the embodiments of this application.

The vehicle traveling decision controller collects traveling data of a forward vehicle in a specific range using a sensing system, obtains, by combining a positioning system and a high-definition map, a value of each static factor in a traveling scenario in which a current vehicle is located, and comprehensively calculates a complexity of the traveling scenario in which the vehicle is located.

Figure 2:
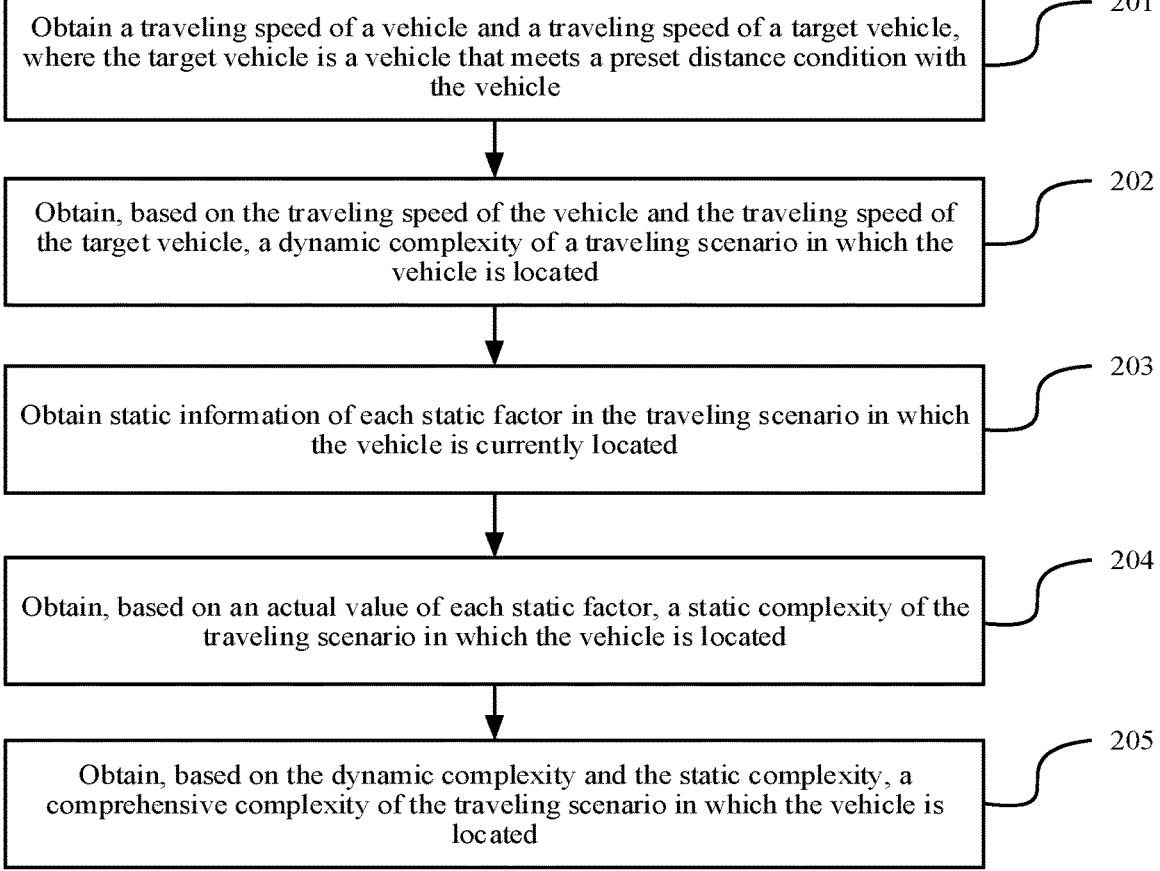
FIG. 2 is a flowchart of a method for detecting a complexity of a traveling scenario of a vehicle according to an embodiment of this application.

Referring to FIG. 2, a processing process of a method for detecting a complexity of a traveling scenario of a vehicle provided in an embodiment of this application may include the following steps:

Step 201. Obtain a traveling speed of the vehicle and a traveling speed of a target vehicle, where the target vehicle is a vehicle that meets a preset distance condition with the vehicle.

In an implementation, the target vehicle that meets the preset distance condition with the vehicle may be first determined as a research vehicle for subsequently calculating a dynamic complexity of a traveling scenario in which the vehicle is located. A method for determining the target vehicle that meets the preset distance condition with the vehicle may be as follows.

A forward vehicle in the traveling scenario in which the vehicle is located is detected using a radar, and if there is a forward vehicle in a same lane as the vehicle, a forward vehicle that has a minimum distance from the vehicle is determined as a reference vehicle. Next, a traveling speed of the reference vehicle and a component of a distance between the reference vehicle and the vehicle in a traveling direction of the vehicle are obtained using the radar. Herein, a component of a distance between a vehicle and the current vehicle in the traveling direction of the current vehicle may also be referred to as a vertical distance between the vehicle and the current vehicle.

Then, a second safe distance $d_{min}$ between the reference vehicle and the vehicle is calculated. A calculation formula may be as follows:

$$d_{min} = \left[ V_{following}\rho + \frac{a_{max,\,accel}\rho^2}{2} + \frac{(V_{following} + a_{max,\,accel}\rho)^2}{2a_{min,\,brake}} - \frac{V_{leading}^2}{2b_{max,\,brake}} \right].$$

$V_{following}$ is the traveling speed of the vehicle, $V_{leading}$ is the traveling speed of the reference vehicle, $a_{max,\,accel}$ is a preset maximum acceleration of the vehicle, for example, may be 0.2 g, where g is a gravity acceleration, $a_{min,\,brake}$ is a preset minimum deceleration of the vehicle, for example, may be 0.3 g, $b_{max,\,brake}$ represents a preset maximum deceleration of the forward vehicle, for example, may be 0.4 g, and $\rho$ is a preset driver reaction time, for example, may be 2 seconds (s).

Figure 3:
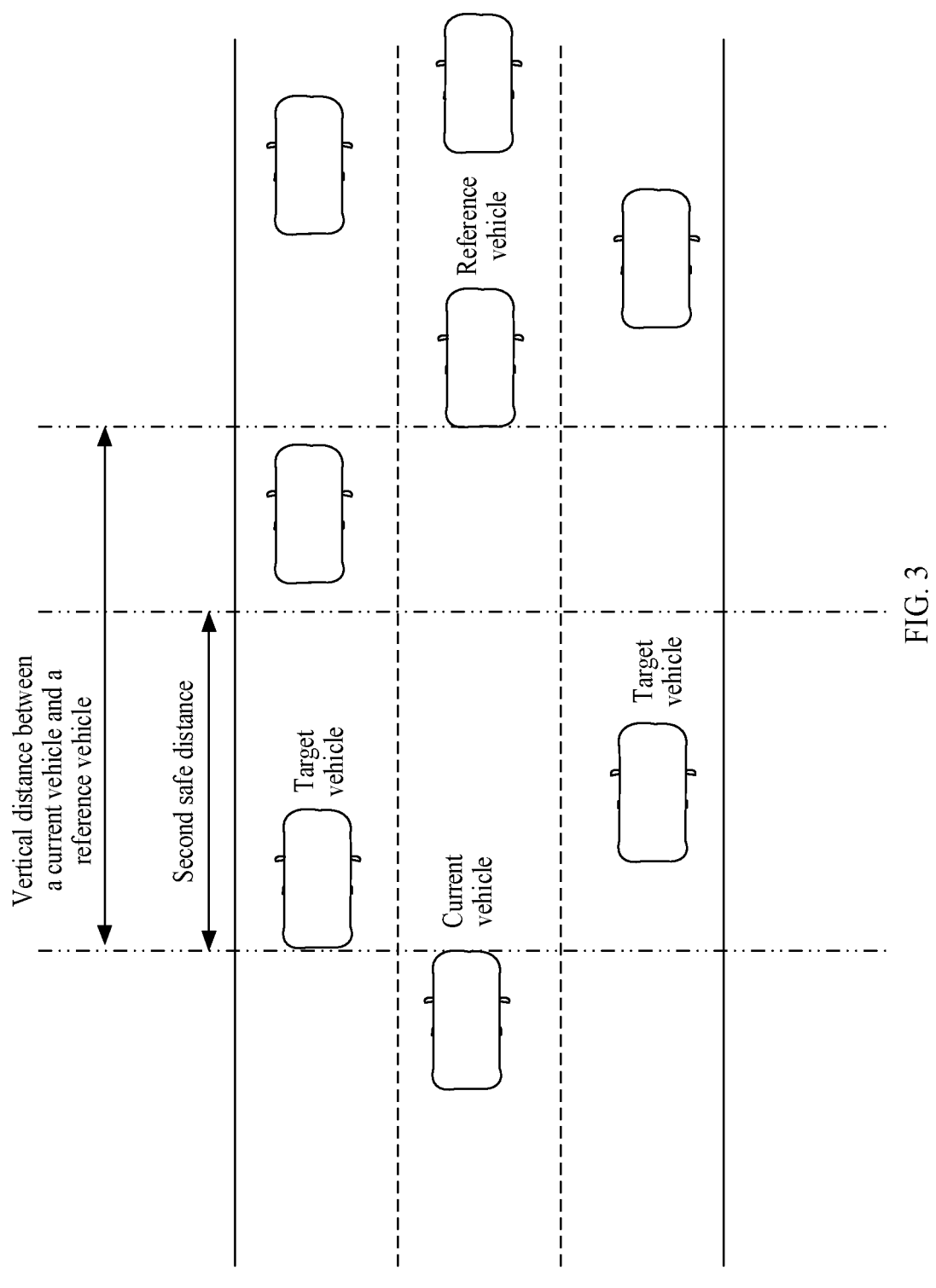
FIG. 3 is a schematic diagram of a target vehicle according to an embodiment of this application.
Figures 4, 5:
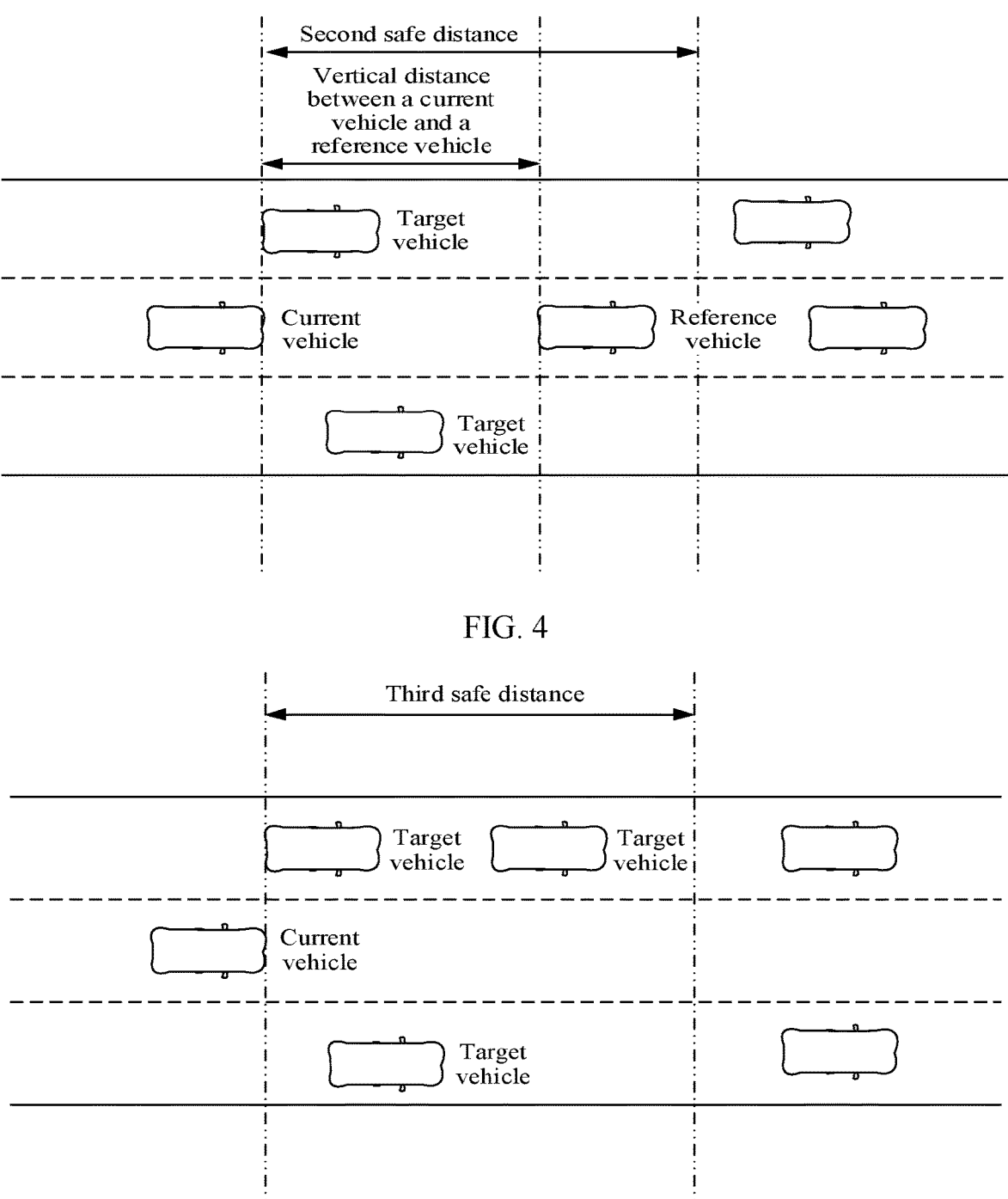
FIG. 4 is a schematic diagram of a target vehicle according to an embodiment of this application.
FIG. 5 is a schematic diagram of a target vehicle according to an embodiment of this application.

Subsequently, a smaller value in the determined second safe distance and the vertical distance between the reference vehicle and the vehicle may be determined. A forward vehicle in a lane in which the vehicle is located and an adjacent lane is determined as the target vehicle, where a vertical distance between the forward vehicle and the vehicle is not greater than the smaller value. FIG. 3 shows a target vehicle determined when the second safe distance is less than the vertical distance between the reference vehicle and the vehicle. FIG. 4 shows a target vehicle determined when the second safe distance is greater than the vertical distance between the reference vehicle and the vehicle.

If there is no forward vehicle in a same lane as the vehicle, it may be assumed that there is a forward vehicle in a same lane as the vehicle, the forward vehicle is used as a reference vehicle, and a traveling speed of the assumed reference vehicle is 0. A third safe distance between the reference vehicle and the vehicle is calculated. A calculation formula of the third safe distance is the same as the calculation formula of the second safe distance, and details are not described herein again. FIG. 5 shows a target vehicle determined when there is no forward vehicle in a same lane as the vehicle.

Step 202. Obtain, based on the traveling speed of the vehicle and the traveling speed of the target vehicle, a dynamic complexity of a traveling scenario in which the vehicle is located.

In an implementation, for each target vehicle, a complexity corresponding to the target vehicle is determined based on the traveling speed of the vehicle and a traveling speed of the target vehicle. The determined complexities corresponding to the target vehicles are added to obtain the dynamic complexity of the traveling scenario in which the vehicle is located. The following describes a method for determining the complexity corresponding to the target vehicle.

First, an included angle $\theta_{ij}$ between the traveling direction of the vehicle and a relative traveling speed between the vehicle and the target vehicle is calculated. A calculation formula may be as follows:

$$\theta_{ij} = \tan^{-1}\frac{|\overrightarrow{V_{h\_ij}}|}{|\overrightarrow{V_{v\_ij}}|}, \text{ where } \theta_{ij} \in [0°, 90°].$$

$\overrightarrow{V_{h\_ij}}$ is a horizontal relative speed between the vehicle and the target vehicle, namely, a value obtained by subtracting a component of the traveling speed of the vehicle in a horizontal direction perpendicular to the traveling direction of the vehicle from a component of the traveling speed of the target vehicle in the horizontal direction perpendicular to the traveling direction of the vehicle, and $\overrightarrow{V_{v\_ij}}$ is a vertical relative speed between the vehicle and the target vehicle, namely, a value obtained by subtracting a component of the traveling speed of the vehicle in the traveling direction of the vehicle from a component of the traveling speed of the target vehicle in the traveling direction of the vehicle.

Next, the calculated included angle $\theta_{ij}$ is substituted into the following formula:

$$f(\theta_{ij}) = \frac{1}{2}\left\{1 - \cos\left[\left(\frac{180}{67.5}\right)\cdot\frac{2\theta_{ij}}{3}\cdot\frac{\pi}{180} + \frac{\pi}{10}\right]\right\}.$$   5

An initial complexity $f(\theta_{ij})$ corresponding to the target vehicle may be obtained.

Then, the initial complexity $f(\theta_{ij})$ corresponding to the target vehicle may be corrected based on a distance between the target vehicle and the vehicle and the relative speed between the target vehicle and the vehicle, to obtain the complexity corresponding to the target vehicle. The correction method may include the following steps:

1. Calculate a vertical correction coefficient, where a method for calculating the vertical correction coefficient may be as follows.

First, a first safe distance between the vehicle and the target vehicle is calculated. A calculation formula of the first safe distance is the same as the calculation formula of the second safe distance, and details are not described herein again. Next, a first difference between a preset danger distance $\overrightarrow{D_{v\_max}}$ and a vertical distance $\overrightarrow{D_{v\_ij}}$ between the target vehicle and the vehicle is calculated. Then, a second difference between a safety critical value $\overrightarrow{D_{v\_min}}$ and the preset danger distance $\overrightarrow{D_{v\_max}}$ is calculated. The safety critical value $\overrightarrow{D_{v\_min}}$ may be the first safe distance between the vehicle and the target vehicle, and $\overrightarrow{D_{v\_max}}$ may be 0 m. Subsequently, a ratio between the first difference and the second difference is calculated to obtain a standard vertical distance p between the vehicle and the target vehicle. The standard vertical distance p may be represented as follows:

$$p = (\overrightarrow{D_{v\_max}} - \overrightarrow{D_{v\_ij}})/(\overrightarrow{D_{v\_max}} - \overrightarrow{D_{v\_min}}).$$

Then, the standard vertical distance p is substituted into the formula $f_1(p) = (1-p)\lg(1/p)$, to obtain the vertical correction coefficient $f_1(p)$.

2. Calculate a horizontal correction coefficient, where a method for calculating the horizontal correction coefficient may be as follows.

First, a third difference between a preset danger horizontal relative speed $\overrightarrow{V_{h\_max}}$ and the horizontal relative speed $\overrightarrow{V_{h\_ij}}$ between the target vehicle and the vehicle is calculated. Next, a fourth difference between a preset safe horizontal relative speed $\overrightarrow{V_{h\_min}}$ and the preset danger horizontal relative speed $\overrightarrow{V_{h\_max}}$ is calculated. $\overrightarrow{V_{h\_min}}$ may be 3.5 m/s, and indicates that a speed at which the vehicle and the target vehicle approach each other in a horizontal direction is 3.5 m/s. $\overrightarrow{V_{h\_max}}$ may be −3.5 m/s, and indicates that a speed at which the vehicle and the target vehicle are separated from each other in the horizontal direction is 3.5 m/s. Subsequently, a ratio between the third difference and the fourth difference is calculated to obtain a standard horizontal relative speed q between the vehicle and the target vehicle. The standard horizontal relative speed q may be represented as follows:

$$q = (\overrightarrow{V_{h\_max}} - \overrightarrow{V_{h\_ij}})/(\overrightarrow{V_{h\_max}} - \overrightarrow{V_{h\_min}}).$$

Then, the standard horizontal relative speed q is substituted into the formula $f_1(q) = (1-q)\lg(1/q)$, to obtain the horizontal correction coefficient $f_1(q)$.

3. Multiply the initial complexity $f(\theta_{ij})$, the vertical correction coefficient $f_1(p)$, and the horizontal correction coefficient $f_1(q)$, to obtain the complexity corresponding to the target vehicle. It should be noted herein that the sequence of calculating the vertical correction coefficient and the horizontal correction coefficient is merely an example. The sequence of calculating the two correction coefficients is not limited in this embodiment of this application, and the two correction coefficients may be calculated in parallel in a possible implementation.

Step 203. Obtain static information of each static factor in the traveling scenario in which the vehicle is currently located.

The static factor includes a road type, a quantity of co-directional lanes, a lane width, a central isolation form, an isolation form between a motor vehicle and a non-motor vehicle, a traffic sign, and a traffic light.

In an implementation, a positioning system may be used to determine a current location, and a high-definition map may be used to determine the static information of each static factor at the current location (the traveling scenario in which the vehicle is located) of the vehicle. For example, the following is obtained. In the traveling scenario in which the vehicle is currently located, the road type is an urban expressway, the quantity of co-directional lanes is 2, a lane width greater than 3.5 m is a wide lane, the central isolation form is greening isolation, the isolation form between the motor vehicle and the non-motor vehicle is greening isolation, the traffic sign is that there is a speed limit sign, and the traffic light is that there is a traffic light. The following describes possible static information of each static factor.

Static information of the road type may be an urban expressway, a trunk road, a secondary trunk road, and a branch way. Static information of the quantity of co-directional lanes may be 1, 2, 3, 4, 5, 6, and the like. Static information of the lane width may be 3 m, 3.5 m, 4 m, 4.5 m, and the like. Static information of the central isolation form may be: there is no central isolation, marking-line isolation, a hard barrier, and greening isolation. Static information of the isolation form between the motor vehicle and the non-motor vehicle may be: there is no isolation between the motor vehicle and the non-motor vehicle, marking-line isolation, a hard barrier, and greening isolation. Static information of the traffic sign may be: a speed limit sign of 40 km/h, a speed limit sign of 60 km/h, there is no speed limit sign, and the like. Static information of the traffic light is that the traffic light is a red light, the traffic light is a green light, the traffic light is a yellow light, and there is no traffic light.

Step 204: Obtain, based on the static information of each static factor, a static complexity of the traveling scenario in which the vehicle is located.

In an implementation, values of a plurality of static factors in the traveling scenario in which the vehicle is located may be first obtained based on determined static information of the plurality of static factors. Next, complexities respectively corresponding to the values of the plurality of static factors in the traveling scenario in which the vehicle is located are determined based on a correspondence between a value of a static factor and a complexity. Finally, the static complexity of the traveling scenario in which the vehicle is located is obtained based on the complexities respectively corresponding to the plurality of static factors.

Because the static factor has various static information, if each piece of static information independently corresponds to one value, the correspondence between a value of a static factor and a complexity is relatively complex. Therefore, for some static information, a plurality of pieces of static information may correspond to one value. The following describes a relationship between the static information of the static factor and the value of the static factor.

The static information of the road type may be directly determined as a value of the road type, that is, values respectively corresponding to the static information: the urban expressway, the trunk road, the secondary trunk road, and the branch way may also be the urban expressway, the trunk road, the secondary trunk road, and the branch way. When the static information of the quantity of co-directional lanes is 1 to 4, the static information of the quantity of co-directional lanes may be directly determined as a value of the quantity of co-directional lanes. When the static information of the quantity of co-directional lanes is 5, 6, 7, and the like, a same value "≥5" may be correspondingly determined. When the static information of the lane width is 3 m and 3.5 m, a same value "≤3.5 m" may be correspondingly determined. When the static information of the lane width is 4 m, 4.5 m, and the like, a same value ">3.5 m" may be correspondingly determined. The static information of the central isolation form may be directly determined as a value of the central isolation form. The static information of the isolation form between the motor vehicle and the non-motor vehicle may be directly determined as a value of the isolation form between the motor vehicle and the non-motor vehicle. When the static information of the traffic sign is a speed limit sign of 40 km/h, a speed limit sign of 60 km/h, and the like, a corresponding value may be "there is a speed limit sign". When the static information of the traffic sign is that there is no speed limit sign, a corresponding value may be "there is no speed limit sign". When the static information corresponding to the traffic light is that the traffic light is a red light, the traffic light is a green light, and the traffic light is a yellow light, a same value "there is a traffic light" may be correspondingly determined. When the static information corresponding to the traffic light is that there is no traffic light, a corresponding value may be "there is no traffic light".

A value of each static factor may be shown in the following Table 1.

TABLE 1

| Static factor | Value |
| --- | --- |
| Road type | Urban expressway, trunk road, secondary trunk road, and branch way |
| Quantity of co-directional lanes | 1, 2, 3, 4, 5, and a value greater than 5 |
| Lane width | Wide lane (lane width ≥3.5 m) and narrow lane (lane width <3.5 m) |
| Central isolation form | There is no central isolation, marking-line isolation, hard barrier, and greening isolation |
| Isolation form between a motor vehicle and a non-motor vehicle | There is no isolation between the motor vehicle and the non-motor vehicle, marking-line isolation, hard barrier, and greening isolation |
| Traffic sign | There is a speed limit sign and there is no speed limit sign |
| Traffic light | There is a traffic light and there is no traffic light |

The correspondence between a value of a static factor and a complexity may be shown in Table 2.

TABLE 2

| Static factor | Value (complexity) |
| --- | --- |
| Road type | Urban expressway ($c_{1,\,1}$), trunk road ($c_{1,\,2}$), secondary trunk road ($c_{1,\,3}$), and branch way ($c_{1,\,4}$) |
| Quantity of co-directional lanes | 1 ($c_{2,\,1}$), 2 ($c_{2,\,2}$), 3 ($c_{2,\,3}$), 4 ($c_{2,\,4}$), 5, and a value greater than 5 ($c_{2,\,5}$) |

TABLE 2-continued

| Static factor | Value (complexity) |
| --- | --- |
| Lane width | Wide lane ($c_{3,\,1}$) and narrow lane ($c_{3,\,2}$) |
| Central isolation form | There is no central isolation ($c_{4,\,1}$), marking-line isolation ($c_{4,\,2}$), hard barrier ($c_{4,\,3}$), and greening isolation ($c_{4,\,4}$) |
| Isolation form between a motor vehicle and a non-motor vehicle | There is no isolation between the motor vehicle and the non-motor vehicle ($c_{5,\,1}$), marking-line isolation ($c_{5,\,2}$), hard barrier ($c_{5,\,3}$), and greening isolation ($c_{5,\,4}$) |
| Traffic sign | There is a speed limit sign ($c_{6,\,1}$) and there is no speed limit sign ($c_{6,\,2}$) |
| Traffic light | There is a traffic light ($c_{7,\,1}$) and there is no traffic light ($c_{7,\,2}$) |

For each static factor, a weight corresponding to the static factor may be obtained based on a correspondence between a static factor and a weight, and a complexity corresponding to the static factor is multiplied by the weight corresponding to the static factor, to obtain a weighted complexity of the static factor. The correspondence between a static factor and a weight may be shown in Table 3.

Finally, the weighted complexities corresponding to the static factors are added to obtain the static complexity of the traveling scenario in which the vehicle is located.

TABLE 3

| Static factor | Weight |
| --- | --- |
| Road type | $W_1$ |
| Quantity of co-directional lanes | $W_2$ |
| Lane width | $W_3$ |
| Central isolation form | $W_4$ |
| Isolation form between a motor vehicle and a non-motor vehicle | $W_5$ |
| Traffic sign | $W_6$ |
| Traffic light | $W_7$ |

In a possible implementation, a technical person may pre-determine a complexity corresponding to each value of each static factor. A method for determining the complexity corresponding to each value of each static factor may be as follows:

For each value of each static factor, N sample images corresponding to the value are obtained. N is an integer greater than 1. The sample image may be obtained in the following manner. The sample image is captured using a high-definition streetscape map, is photographed in the field, is downloaded using the Internet, or the like A method for obtaining the sample image is not limited in this embodiment of this application. Then, image recognition is separately performed on the N sample images to obtain a predicted value corresponding to each sample image. A quantity M of sample images whose corresponding predicted values are different from corresponding ground truth values is counted. The ground truth value is used to uniquely identify a value. A ratio of M to N is determined as the complexity corresponding to the value. The following uses determining of a complexity corresponding to greening isolation as an example for description.

In the high-definition streetscape map, 100 streetscape images with greening isolation are captured as sample images corresponding to greening isolation. Certainly, 100 streetscape images with greening isolation may be photographed in the field as sample images corresponding to greening isolation, or 100 streetscape images with greening isolation may be downloaded, using the Internet, as sample images corresponding to greening isolation. Then, image recognition may be separately performed on the 100 sample images using an image recognition algorithm. Herein, the image recognition algorithm may be a trained neural network model or the like. Each value of the central isolation form may correspond to one ground truth value, for example, no central isolation is 0, marking-line isolation is 1, a hard barrier is 2, and greening isolation is 3. After image recognition is performed on each sample image, a predicted value corresponding to the sample image may be obtained. If the predicted value is different from the ground truth $$V_k = \sqrt[n]{M_k}.$$

Finally, a feature vector $W_k$ of a static factor importance determining matrix, namely, the weight corresponding to the static factor, is calculated. A calculation formula may be as follows:

$$W_k = \frac{V_k}{\sum\limits_{k=1}^{n} V_k}.$$

TABLE 4

| | Static factor 1 | | | | | | |
| Static factor k | Road type | Quantity of co-directional lanes | Lane width | Central isolation form | Isolation form between a motor vehicle and a non-motor vehicle | Traffic sign | Traffic light |
|---|---|---|---|---|---|---|---|
| Road type | $b_{11}$ | $b_{12}$ | $b_{13}$ | $b_{14}$ | $b_{15}$ | $b_{16}$ | $b_{17}$ |
| Quantity of co-directional lanes | $b_{21}$ | $b_{22}$ | $b_{23}$ | $b_{24}$ | $b_{25}$ | $b_{26}$ | $b_{27}$ |
| Lane width | $b_{31}$ | $b_{32}$ | $b_{33}$ | $b_{34}$ | $b_{35}$ | $b_{36}$ | $b_{37}$ |
| Central isolation form | $b_{41}$ | $b_{42}$ | $b_{43}$ | $b_{44}$ | $b_{45}$ | $b_{46}$ | $b_{47}$ |
| Isolation form between a motor vehicle and a non-motor vehicle | $b_{51}$ | $b_{52}$ | $b_{53}$ | $b_{54}$ | $b_{55}$ | $b_{56}$ | $b_{57}$ |
| Traffic sign | $b_{61}$ | $b_{62}$ | $b_{63}$ | $b_{64}$ | $b_{65}$ | $b_{66}$ | $b_{67}$ |
| Traffic light | $b_{71}$ | $b_{72}$ | $b_{73}$ | $b_{74}$ | $b_{75}$ | $b_{76}$ | $b_{77}$ | value, it is considered that recognition is incorrect, and a quantity of sample images that are incorrectly recognized is recorded. For example, if there are 90 sample images that are incorrectly recognized, the quantity 90 of sample images that are incorrectly recognized is divided by the total quantity 100 of sample images to obtain a recognition error rate 90%. The recognition error rate may be used as the complexity corresponding to greening isolation.

The weight corresponding to each static factor may be determined and stored using an analytic hierarchy process. The following describes a process of determining, using the analytic hierarchy process, the weight corresponding to the static factor.

First, a technical person may fill in a static factor importance determining matrix table based on a ratio scale table used when static factors are compared. The static factor importance determining matrix table may be shown in Table 4, and the ratio scale table may be shown in the following Table 5.

Then, a product of elements $b_{kl}$ in each row of the static factor importance determining matrix table is calculated. A calculation formula may be as follows:

$$M_k = \sum_{l=1}^{n} b_{kl}, (k = 1, 2, \ldots, n), \text{ where } n = 7.$$

Subsequently, an $n^{th}$ root $V_k$ of $M_k$ is calculated. A calculation formula may be as follows:

TABLE 5

| Ratio of a factor k to a factor l | Quantized value |
|---|---|
| Equal importance | 1 |
| Slight importance | 3 |
| Strong importance | 5 |
| Intense importance | 7 |
| Extreme importance | 9 |
| Intermediate value of two times of adjacent determining | 2, 4, 6, 8 |

Step 205: Determine, based on the dynamic complexity and the static complexity, a comprehensive complexity of the traveling scenario in which the vehicle is located.

In an implementation, the determined dynamic complexity and the determined static complexity may be directly added to obtain the comprehensive complexity of the traveling scenario in which the vehicle is located.

In a possible implementation, an environment factor of the traveling scenario in which the vehicle is located may be considered to comprehensively determine the comprehensive complexity of the traveling scenario in which the vehicle is located. A determining method may be as follows: obtaining environment information of an environment factor in the traveling scenario in which the vehicle is located, obtaining a value of the environment factor based on the environment information of the environment factor, determining, based on a stored correspondence between a value of an environment factor and a complexity correction coefficient, a target complexity correction coefficient corresponding to the environment factor in the traveling scenario in which the vehicle is located, and multiplying, by the target complexity correction coefficient, a value obtained by adding the dynamic complexity and the static complexity, to obtain the comprehensive complexity of the traveling scenario in which the vehicle is located.

The environment factor includes lighting, weather, and a road surface condition.

In an implementation, an environment image in the traveling scenario may be obtained using a camera of a sensing system of the vehicle, and environment information of each environment factor is recognized from the environment image using a pattern recognition algorithm constructed in advance. Because an output of the pattern recognition algorithm is several pieces of preset possible environment information, the environment information of the environment factor may be directly determined as the value of the environment factor. A value of each environment factor may be shown in the following Table 6.

TABLE 6

| Environment factor | Value |
| --- | --- |
| Lighting | Daytime, dusk or dawn, night with lighting, and night without lighting |
| Weather | Sunny day, cloudy day, rainy day, snowy day, and foggy day |
| Road surface condition | Dryness, wetness, accumulated snow, and ice |

The correspondence between a value of each environment factor and a complexity correction coefficient may be shown in the following Table 7. It should be noted that Table 7 merely provides an example of the complexity correction coefficient.

TABLE 7

| Environment factor | Value (complexity correction coefficient) |
| --- | --- |
| Lighting | Daytime (1), dusk or dawn (1.2), night with lighting (1.5), and night without lighting (2) |
| Weather | Sunny day (1), cloudy day (1.2), rainy day (1.8), snowy day (1.5), and foggy day (2) |
| Road surface condition | Dryness (1), wetness (1.5), accumulated snow (1.8), and ice (2) |

Then, a complexity correction coefficient corresponding to each environment factor in the traveling scenario in which the vehicle is located may be determined by querying the correspondence between a value of each environment factor and a complexity correction coefficient. Subsequently, the determined complexity correction coefficients corresponding to the environment factors are multiplied to obtain the target complexity correction coefficient.

For example, the obtained value of each environment factor is as follows. The lighting is daytime, the weather is a rainy day, and the road surface condition is wetness. Correspondingly, it may be determined, through query, that a complexity correction coefficient corresponding to the daytime is 1, a complexity correction coefficient corresponding to the rainy day is 1.8, and a complexity correction coefficient corresponding to the wetness is 1.5, and the three complexity correction coefficients are multiplied to obtain the target complexity correction coefficient 2.7.

Finally, the obtained target complexity correction coefficient is multiplied by a sum of the determined dynamic complexity and the determined static complexity to obtain the comprehensive complexity of the traveling scenario in which the vehicle is located.

In a possible implementation, after the comprehensive complexity of the traveling scenario in which the vehicle is located is calculated, whether to provide a manual driving takeover prompt may be determined based on the calculated comprehensive complexity.

In an implementation, the comprehensive complexity may be displayed on a display screen in the self-driving car in real time such that a driver can learn of, in real time, the complexity of the traveling environment in which the vehicle is located. In addition, a danger complexity threshold may be set. When the calculated comprehensive complexity is greater than the set danger complexity threshold, the manual driving takeover prompt may be displayed on the display screen. In addition, a voice prompt may be provided at the same time, to prompt the driver to perform manual driving due to a high complexity of a current driving environment.

In this embodiment of this application, the static complexity of the traveling scenario in which the vehicle is located is determined based on the static information of each static factor in the traveling scenario in which the vehicle is located. In addition, the dynamic complexity of the traveling scenario in which the vehicle is located is further determined based on the traveling speed of the vehicle and the traveling speed of the target vehicle. The target vehicle is a vehicle that meets the preset distance condition with the vehicle. In this way, the comprehensive complexity of the traveling scenario in which the vehicle is located is comprehensively determined by combining the static complexity determined using the static factor and the dynamic complexity determined using a traveling status of a surrounding vehicle. The comprehensive complexity may more fully reflect an actual complexity of the traveling scenario in which the vehicle is currently located.

Figure 6:
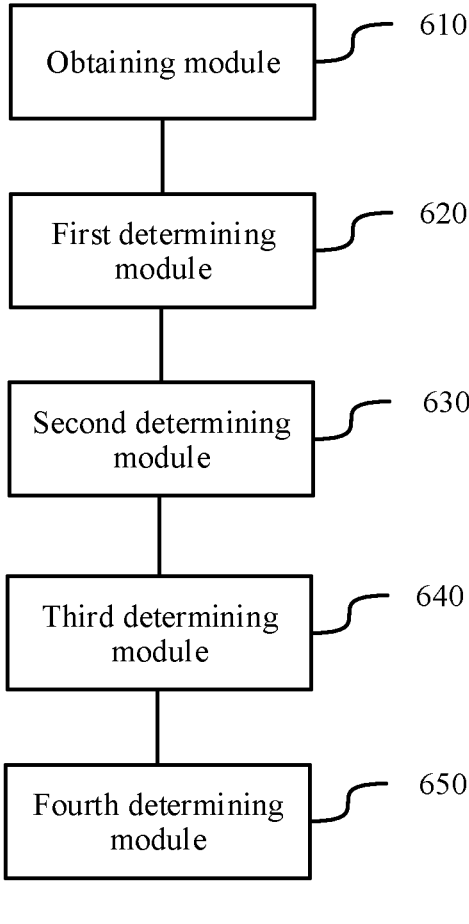
FIG. 6 is a schematic diagram of a structure of an apparatus for detecting a complexity of a traveling scenario of a vehicle according to an embodiment of this application.

Based on a same technical concept, an embodiment of this application further provides an apparatus for detecting a complexity of a traveling scenario of a vehicle. As shown in FIG. 6, the apparatus includes an obtaining module 610 configured to obtain a traveling speed of the vehicle and a traveling speed of a target vehicle, where the target vehicle is a vehicle that meets a preset distance condition with the vehicle, and the obtaining function in step 201 and another implicit step may be implemented, a first determining module 620 configured to obtain, based on the traveling speed of the vehicle and the traveling speed of the target vehicle, a dynamic complexity of a traveling scenario in which the vehicle is located, where the obtaining function in step 202 and another implicit step may be implemented, a second determining module 630, configured to obtain static information of a static factor in the traveling scenario in which the vehicle is located, where the obtaining function in step 203 and another implicit step may be implemented, a third determining module 640 configured to obtain, based on the static information of each static factor, a static complexity of the traveling scenario in which the vehicle is located, where the obtaining function in step 204 and another implicit step may be implemented, and a fourth determining module 650 configured to obtain, based on the dynamic complexity and the static complexity, a comprehensive complexity of the traveling scenario in which the vehicle is located, where the obtaining function in step 205 and another implicit step may be implemented.

In a possible implementation, the first determining module 620 is configured to obtain, for each target vehicle based on the traveling speed of the vehicle and a traveling speed of the target vehicle, a complexity corresponding to the target vehicle, and add the complexities corresponding to the target vehicles to obtain the dynamic complexity of the traveling scenario in which the vehicle is located.

In a possible implementation, the first determining module 620 is configured to obtain a relative traveling speed between the vehicle and the target vehicle based on the traveling speed of the vehicle and the traveling speed of the target vehicle, obtain an included angle $\theta_{ij}$ between a traveling direction of the vehicle and the relative traveling speed between the vehicle and the target vehicle, and obtain, based on the included angle $\theta_{ij}$, the complexity corresponding to the target vehicle.

In a possible implementation, the first determining module 620 is configured to substitute the included angle $\theta_{ij}$ into the following equation:

$$f(\theta_{ij}) = \frac{1}{2}\left\{1 - \cos\left[\left(\frac{180}{67.5}\right) \cdot \frac{2\theta_{ij}}{3} \cdot \frac{\pi}{180} + \frac{\pi}{10}\right]\right\},$$

to obtain an initial complexity $f(\theta_{ij})$ corresponding to the target vehicle, and correct, based on a distance between the target vehicle and the vehicle and the relative traveling speed between the target vehicle and the vehicle, the initial complexity $f(\theta_{ij})$ corresponding to the target vehicle, to obtain the complexity corresponding to the target vehicle.

In a possible implementation, the first determining module 620 is configured to obtain a first safe distance between the vehicle and the target vehicle based on the traveling speed, a maximum deceleration, and a minimum deceleration of the vehicle, the traveling speed and a maximum deceleration of the target vehicle, and a preset driver reaction time, calculate a first difference between a preset danger distance and a component of the distance between the target vehicle and the vehicle in the traveling direction of the vehicle, calculate a second difference between the first safe distance and the preset danger distance, calculate a ratio between the first difference and the second difference to obtain a standard vertical distance p between the vehicle and the target vehicle, substitute the standard vertical distance P into the following equation $f_1(p)=(1-p)\lg(1/p)$, to obtain a vertical correction coefficient $f_1(p)$, calculate a third difference between a preset danger horizontal relative speed and a horizontal relative speed between the target vehicle and the vehicle, calculate a fourth difference between a preset safe horizontal relative speed and the preset danger horizontal relative speed, calculate a ratio between the third difference and the fourth difference to obtain a standard horizontal relative speed q between the vehicle and the target vehicle, substitute the standard horizontal relative speed q into the following equation: $f_1(q)=(1-q)\lg(1/q)$, to obtain a horizontal correction coefficient $f_1(q)$, and multiply the initial complexity $f(\theta_{ij})$ corresponding to the target vehicle, the vertical correction coefficient $f_1(q)$, and the horizontal correction coefficient $f_1(q)$, to obtain the complexity corresponding to the target vehicle.

In a possible implementation, the third determining module 640 is configured to obtain values of the plurality of static factors based on static information of the plurality of static factors, and obtain, based on a correspondence between the values of the plurality of static factors and complexities, complexities respectively corresponding to the plurality of static factors, and obtain, based on the complexities respectively corresponding to the plurality of static factors, the static complexity of the traveling scenario in which the vehicle is located.

In a possible implementation, the third determining module 640 is configured to obtain weights respectively corresponding to the plurality of static factors, respectively multiply the complexities corresponding to the values of the plurality of static factors by the corresponding weights to obtain weighted complexities respectively corresponding to the plurality of static factors, and add the weighted complexities corresponding to the plurality of static factors to obtain the static complexity of the traveling scenario in which the vehicle is located.

In a possible implementation, the apparatus further includes a counting module configured to: for a first value of a first static factor, obtain N sample images corresponding to the first value, where N is an integer greater than 1, separately perform image recognition on the N sample images to obtain a predicted value corresponding to each sample image, count a quantity M of sample images whose corresponding predicted values are different from corresponding ground truth values, where the ground truth value is used to uniquely identify the first value, and obtain a ratio of M to N as a complexity corresponding to the first value.

In a possible implementation, the static factor includes at least one of a road type, a quantity of co-directional lanes, a lane width, a central isolation form, an isolation form between a motor vehicle and a non-motor vehicle, a traffic sign, and a traffic light.

In a possible implementation, the apparatus further includes a correction module configured to obtain environment information of an environment factor in the traveling scenario in which the vehicle is located, obtain a value of the environment factor based on the environment information of the environment factor; and obtain, based on a stored correspondence between a value of an environment factor and a complexity correction coefficient, a target complexity correction coefficient corresponding to the value of the environment factor in the traveling scenario in which the vehicle is located, and the fourth module 650 is configured to multiply, by the target complexity correction coefficient, a value obtained by adding the dynamic complexity and the static complexity, to obtain the comprehensive complexity of the traveling scenario in which the vehicle is located.

In a possible implementation, the environment factor includes at least one of lighting, weather, and a road surface condition.

In a possible implementation, the obtaining module 610 is configured to: if there is a forward vehicle in a same lane as the vehicle, determine, as a reference vehicle, a forward vehicle that is in the forward vehicle in the same lane as the vehicle and that has a minimum distance from the vehicle, obtain a traveling speed of the reference vehicle and a component of a distance between the reference vehicle and the vehicle in the traveling direction of the vehicle, obtain a second safe distance between the vehicle and the reference vehicle based on the traveling speed, a preset maximum acceleration, and a preset minimum deceleration of the vehicle, the traveling speed and a preset maximum deceleration of the reference vehicle, and the preset driver reaction time, obtain a smaller value in the second safe distance and the component of the distance between the reference vehicle and the vehicle in the traveling direction of the vehicle, and use, as the target vehicle, a forward vehicle in a lane in which the vehicle is located and an adjacent lane, where a component of a distance between the forward vehicle and the vehicle in the traveling direction of the vehicle is not greater than the smaller value, or if there is no forward vehicle in a same lane as the vehicle, obtain a third safe distance based on the traveling speed, a preset maximum acceleration, and a preset minimum deceleration of the vehicle, a preset forward-vehicle traveling speed, the preset maximum deceleration, and the preset driver reaction time, where the preset forward-vehicle traveling speed is 0, and use, as the target vehicle, a forward vehicle in a lane in which the vehicle is located and an adjacent lane, where a component of a distance between the forward vehicle and the vehicle in the traveling direction of the vehicle is not greater than the third safe distance.

It should be further noted that, when the apparatus for detecting a complexity of a traveling scenario of a vehicle provided in the foregoing embodiment detects the complexity of the traveling scenario of the vehicle, division of the foregoing functional modules is merely used as an example for description. In actual application, the foregoing functions may be allocated to different functional modules and implemented as required, that is, an internal structure of a vehicle traveling decision controller is divided into different functional modules, to implement all or some of the functions described above. In addition, the apparatus for detecting a complexity of a traveling scenario of a vehicle provided in the foregoing embodiment belongs to a same concept as the embodiment of the method for detecting a complexity of a traveling scenario of a vehicle. For a specific implementation process thereof, refer to the method embodiment. Details are not described herein again.

All or some of the foregoing embodiments may be implemented using software, hardware, firmware, or any combination thereof. When software is used to implement the embodiments, the embodiments may be implemented all or partially in a form of a computer program product. The computer program product includes one or more computer instructions. When the computer program instructions are loaded and executed on a device, the procedures or the functions in the embodiments of this application are all or partially generated. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial optical cable, an optical fiber, or a digital subscriber line) or wireless (for example, infrared, radio, or microwave) manner. The computer-readable storage medium may be any usable medium accessible by a device, or a data storage device, such as a server or a data center, integrating one or more usable media. The usable medium may be a magnetic medium (such as a floppy disk, a hard disk, and a magnetic tape), or may be an optical medium (such as a digital video disc (DVD)) or a semiconductor medium (such as a solid-state drive).

A person of ordinary skill in the art may understand that all or some of the steps of the foregoing embodiments may be implemented by hardware or a program instructing related hardware. The program may be stored in a computer-readable storage medium. The storage medium may be a read-only memory, a magnetic disk, a compact disc, or the like.

The foregoing description is merely optional embodiments of this application, but is not intended to limit this application. Any modification, equivalent replacement, or improvement made without departing from the spirit and principle of this application should fall within the protection scope of this application.

What is claimed is:

1. A method comprising:

obtaining, using a sensor, a first traveling speed of a vehicle and a second traveling speed of a target vehicle, wherein the target vehicle meets a preset distance condition with the vehicle;

obtaining an included angle ($\theta_{ij}$) between a first traveling direction and a relative traveling speed between the vehicle and the target vehicle based on the first traveling speed and the second traveling speed;

obtaining an initial complexity ($f(\theta_{ij})$) corresponding to the target vehicle by substituting the included angle in the following equation:

$$f(\theta_{ij}) = \frac{1}{2}\left\{1 - \cos\left[\left(\frac{180}{67.5}\right) \cdot \frac{2\theta_{ij}}{3} \cdot \frac{\pi}{180} + \frac{\pi}{10}\right]\right\};$$

obtaining, based on the initial complexity, a dynamic complexity of a traveling scenario of the vehicle;

obtaining, from a positioning system and a high-definition map, static information of each static factor in the traveling scenario;

obtaining, based on the static information, a static complexity of the traveling scenario;

obtaining, based on the dynamic complexity and the static complexity, a comprehensive complexity of the traveling scenario; and controlling, by a controller of the vehicle, a traveling decision of the vehicle based on the comprehensive complexity.

2. The method of claim 1, wherein obtaining the dynamic complexity comprises:

obtaining, for each of a plurality of target vehicles and based on the first traveling speed and third traveling speeds of the target vehicles, a complexity corresponding to the target vehicle, wherein the target vehicles comprise the target vehicle, and wherein the third traveling speeds comprise the second traveling speed; and adding complexities corresponding to the target vehicles to obtain the dynamic complexity.

3. The method of claim 2, wherein obtaining the complexity corresponding to the target vehicle comprises correcting the initial complexity based on a distance between the target vehicle and the vehicle and a relative speed between the target vehicle and the vehicle to obtain the complexity corresponding to the target vehicle.

4. The method of claim 1, wherein the static factor comprises a plurality of static factors, and wherein obtaining the static complexity comprises:

obtaining values of the static factors based on static information of the static factors;

obtaining complexities respectively corresponding to the static factors based on a correspondence between the values of the static factors and the complexities; and obtaining, based on the complexities, the static complexity.

5. The method of claim 4, wherein obtaining the static complexity comprises:

obtaining weights respectively corresponding to the static factors;

respectively multiplying the complexities corresponding to the values of the static factors by the weights to obtain weighted complexities respectively corresponding to the static factors; and adding the weighted complexities to obtain the static complexity.

6. The method of claim 5, further comprising:

obtaining, for a first value of a first static factor, N sample images corresponding to the first value, wherein N is an integer greater than 1;

separately performing image recognition on the N sample images to obtain a predicted value corresponding to each sample image;

counting a quantity M of sample images whose corresponding predicted values are different from corresponding ground truth values, wherein a ground truth value uniquely identifies the first value; and obtaining a ratio of M to N as a complexity corresponding to the first value.

7. The method of claim 1, wherein the static factor comprises at least one of a road type, a quantity of co-directional lanes, a lane width, a central isolation form, an isolation form between a motor vehicle and a non-motor vehicle, a traffic sign, or a traffic light.

8. The method of claim 1, further comprising:

obtaining environment information of an environment factor in the traveling scenario;

obtaining a value of the environment factor based on the environment information; and obtaining, based on a stored correspondence between the value of the environment factor and a complexity correction coefficient, a target complexity correction coefficient corresponding to the environment factor, wherein obtaining the comprehensive complexity comprises:

obtaining a value by adding the dynamic complexity and the static complexity; and multiplying the value by the target complexity correction coefficient to obtain the comprehensive complexity.

9. The method of claim 8, wherein the environment factor comprises at least one of a lighting condition, a weather condition, or a road surface condition.

10. The method of claim 1, further comprising:

when there is a first forward vehicle in a same lane as the vehicle:

determining, as a reference vehicle, a second forward vehicle that is in the first forward vehicle in the same lane and that has a minimum distance from the vehicle;

obtaining a third traveling speed of the reference vehicle and a first component of a first distance between the reference vehicle and the vehicle;

obtaining a first safe distance between the vehicle and the reference vehicle based on the third traveling speed, a preset maximum acceleration, a preset minimum deceleration of the vehicle, a preset maximum deceleration of the reference vehicle, and a preset driver reaction time;

obtaining a smaller value in the first safe distance and the first component; and using, as the target vehicle, the second forward vehicle in the same lane and an adjacent lane, wherein the first component is not greater than the smaller value; and when there is no first forward vehicle in the same lane:

obtaining a second safe distance between the vehicle and a third forward vehicle based on the third traveling speed, a second preset maximum acceleration, a second preset minimum deceleration of the vehicle, a second preset forward-vehicle traveling speed, the preset maximum deceleration, and the preset driver reaction time, wherein the second preset forward-vehicle traveling speed is 0; and using, as the target vehicle, the third forward vehicle in the same lane in and the adjacent lane, wherein a third component of a distance between the third forward vehicle and the vehicle is not greater than the second safe distance.

11. A controller comprising:

a memory configured to store instructions; and a processor coupled to the memory and configured to:

obtain, using a sensor, a first traveling speed of a vehicle and a second traveling speed of a target vehicle, wherein the target vehicle meets a preset distance condition with the vehicle;

obtain an included angle ($\theta_{ij}$) between a first traveling direction and a relative traveling speed between the vehicle and the target vehicle based on the first traveling speed and the second traveling speed;

obtain an initial complexity ($f(\theta_{ij})$) corresponding to the target vehicle by substituting the included angle in the following equation:

$$f(\theta_{ij}) = \frac{1}{2}\left\{1 - \cos\left[\left(\frac{180}{67.5}\right) \cdot \frac{2\theta_{ij}}{3} \cdot \frac{\pi}{180} + \frac{\pi}{10}\right]\right\};$$

obtain, based on the initial complexity, a dynamic complexity of a traveling scenario of the vehicle;

obtain, from a positioning system and a high-definition map, static information of each static factor in the traveling scenario;

obtain, based on the static information, a static complexity of the traveling scenario;

obtain, based on the dynamic complexity and the static complexity, a comprehensive complexity of the traveling scenario; and control a traveling decision of the vehicle based on the comprehensive complexity.

12. The controller of claim 11, wherein the processor is further configured to:

obtain, for each of a plurality of target vehicles and based on the first traveling speed and third traveling speeds of the target vehicles, a complexity corresponding to the target vehicle, wherein the target vehicles comprise the target vehicle, and wherein the third traveling speeds comprise the second traveling speed; and add complexities corresponding to the target vehicles to obtain the dynamic complexity of the traveling scenario.

13. The controller of claim 11, wherein the static factor comprises a plurality of static factors, and wherein the processor is further configured to:

obtain values of the static factors based on static information of the static factors;

obtain complexities respectively corresponding to the static factors based on a correspondence between the values of the static factors and the complexities; and obtain, based on the complexities, the static complexity.

14. The controller of claim 13, wherein the processor is further configured to:

obtain weights respectively corresponding to the static factors;

respectively multiply the static complexities corresponding to the values of the static factors by the weights to obtain weighted complexities respectively corresponding to the static factors; and add the weighted complexities to obtain the static complexity.

15. The controller of claim 13, wherein the processor is further configured to:
  obtain, for a first value of a first static factor, N sample images corresponding to the first value, wherein N is an integer greater than 1;
  separately perform image recognition on the N sample images to obtain a predicted value corresponding to each sample image;
  count a quantity M of sample images whose corresponding predicted values are different from corresponding ground truth values, wherein a ground truth value uniquely identifies the first value; and
  obtain a ratio of M to N as a third complexity corresponding to the first value.

16. The controller of claim 11, wherein the static factor comprises at least one of a road type, a quantity of co-directional lanes, a lane width, a central isolation form, an isolation form between a motor vehicle and a non-motor vehicle, a traffic sign, or a traffic light.

17. The controller of claim 11, wherein the processor is further configured to:
  obtain environment information of an environment factor in the traveling scenario;
  obtain a value of the environment factor based on the environment information;
  obtain, based on a stored correspondence between the value of the environment factor and a complexity correction coefficient, a target complexity correction coefficient corresponding to the value of the environment factor;
  obtain a value by adding the dynamic complexity and the static complexity; and
  multiply the value by the target complexity correction to obtain the comprehensive complexity.

18. The controller of claim 17, wherein the environment factor comprises at least one of a lighting condition, a weather condition, or a road surface condition.

19. The controller of claim 11, wherein the processor is further configured to:
  when there is a first forward vehicle in a same lane as the vehicle:
    determine, as a reference vehicle, a second forward vehicle that is in the first forward vehicle in the same lane and that has a minimum distance from the vehicle;
    obtain a third traveling speed of the reference vehicle and a first component of a first distance between the reference vehicle and the vehicle;
    obtain a first safe distance between the vehicle and the reference vehicle based on the third traveling speed, a preset maximum acceleration, a preset minimum deceleration of the vehicle, a preset maximum deceleration of the reference vehicle, and a preset driver reaction time;
    obtain a smaller value in the first safe distance and the first component; and
    use, as the target vehicle, the second forward vehicle in the same lane and an adjacent lane, wherein the first component is not greater than the smaller value; and
  when there is no first forward vehicle in the same lane:
    obtain a second safe distance between the vehicle and a third forward vehicle based on the third traveling speed, a second preset maximum acceleration, a second preset minimum deceleration of the vehicle, a second preset forward-vehicle traveling speed, the preset maximum deceleration, and the preset driver reaction time, wherein the second preset forward-vehicle traveling speed is 0; and
    use, as the target vehicle, the third forward vehicle in the same lane and the adjacent lane, wherein a third component of a distance between the forward vehicle and the vehicle is not greater than the second safe distance.

20. A computer program product comprising computer-executable instructions that are stored on a non-transitory computer-readable storage medium and that, when executed by a processor of a controller, cause the controller to:
  obtain, using a sensor, a first traveling speed of a vehicle and a second traveling speed of a target vehicle, wherein the target vehicle meets a preset distance condition with the vehicle;
  obtain an included angle ($\theta_{ij}$) between a first traveling direction and a relative traveling speed between the vehicle and the target vehicle based on the first traveling speed and the second traveling speed;
  obtain an initial complexity ($(f(\theta_{ij}))$) corresponding to the target vehicle by substituting the included angle in the following equation:

$$f(\theta_{ij}) = \frac{1}{2}\left\{1 - \cos\left[\left(\frac{180}{67.5}\right) \cdot \frac{2\theta_{ij}}{3} \cdot \frac{\pi}{180} + \frac{\pi}{10}\right]\right\};$$

obtain, based on the initial complexity, a dynamic complexity of a traveling scenario of the vehicle;
  obtain, from a positioning system and a high-definition map, static information of each static factor in the traveling scenario;
  obtain, based on the static information, a static complexity of the traveling scenario;
  obtain, based on the dynamic complexity and the static complexity, a comprehensive complexity of the traveling scenario; and
  control a traveling decision of the vehicle based on the comprehensive complexity.

* * * * *